United States Patent [19]

Pastusek

[11] 4,381,824
[45] May 3, 1983

[54] DRILL BIT LUBRICATION SYSTEM
[75] Inventor: Paul E. Pastusek, Houston, Tex.
[73] Assignee: Reed Rock Bit Company, Houston, Tex.
[21] Appl. No.: 193,858
[22] Filed: Oct. 3, 1980
[51] Int. Cl.³ .............................................. E21B 10/22
[52] U.S. Cl. ..................................... 175/229; 184/99; 384/93
[58] Field of Search ....................... 175/227, 228, 229; 308/8.2; 184/99

[56] References Cited
U.S. PATENT DOCUMENTS

| | | | |
|---|---|---|---|
| 151,108 | 5/1874 | Evans | 184/99 |
| 1,017,935 | 2/1912 | Watres | 184/99 |
| 1,305,489 | 6/1919 | Patin | 175/227 |
| 1,694,153 | 12/1928 | Watres | 184/99 |
| 1,896,231 | 2/1933 | Fletcher | 175/228 |
| 1,909,128 | 5/1933 | Scott et al. | 175/228 |
| 2,751,196 | 6/1956 | Smith | 175/228 |

Primary Examiner—Ernest R. Purser
Assistant Examiner—Joseph Falk
Attorney, Agent, or Firm—Michael Caddell

[57] ABSTRACT

A lubrication system is disclosed for a rolling cutter drill bit, which system utilizes solid or semi-solid sticks of lubricants located in internal channels and continuously biased against rotating surfaces in the bit.

8 Claims, 5 Drawing Figures

U.S. Patent   May 3, 1983   Sheet 2 of 2   4,381,824
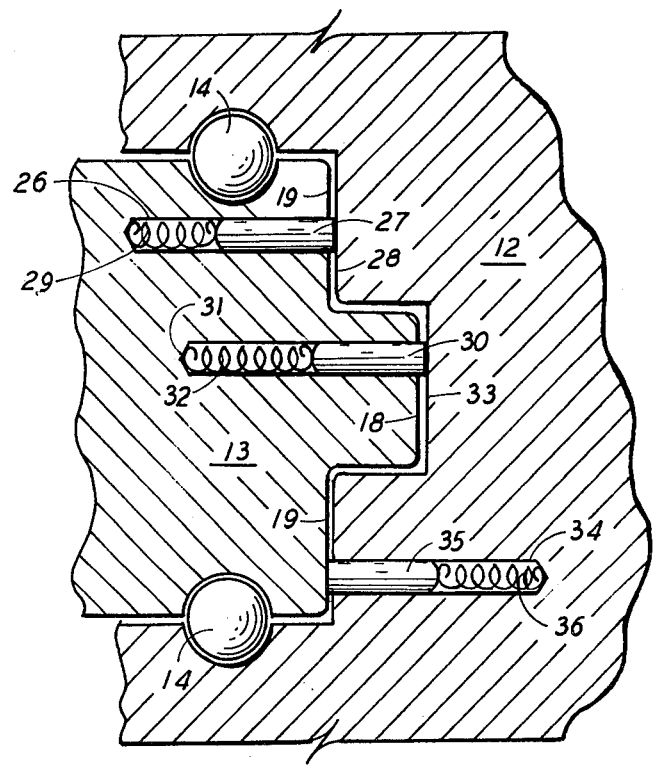
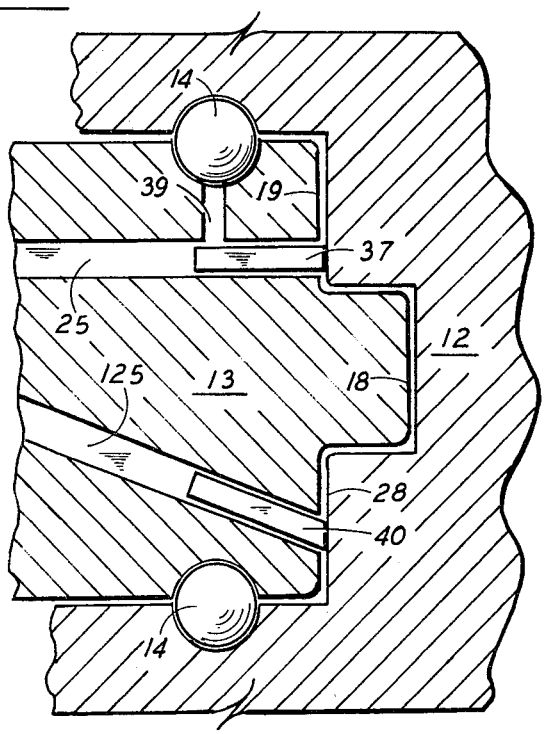
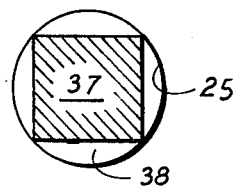
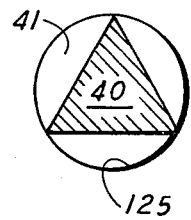

DRILL BIT LUBRICATION SYSTEM

BACKGROUND OF THE INVENTION

The present invention relates generally to drilling bits for drilling underground formations, and more particularly, relates to drilling bits of the type commonly termed, "rolling cutter drill bits". Generally, these bits utilize a plurality of generally frusto-conical shaped cutter shells rotatably mounted on cantilevered bearing journals. Between the cutter shells and the bearing journals, there are usually a number of different bearing systems to take the loads and shocks encountered during the underground drilling. In one particular type of rolling cutter drill bit, a combination of ball bearings and so-called "friction" bearings are used to absorb these thrusts and loadings. The present invention is directed to the friction type bearing system, but is advantageous in all bearing systems utilized in rolling cutter drill bits.

Normally, the friction bearing type rolling cutter bit utilizes a combination of ball bearings and cylindrical bearing sleeves between the cutters and the bearing journals. The bearing sleeves are commonly referred to as journal bearings, or friction bearings. Usually, the bearing system in such a bit is lubricated by internal grease lubrication systems comprising channels and grease reservoirs. Also, these bits have precise sealing systems for maintaining these lubricants in the bearing system and for preventing entry of contaminants, such as well fluids and cuttings.

A second type of rolling cutter drill bit is also commonly used which utilizes both friction bearings and ball bearings, but which is not a sealed bit. Furthermore, this type of bit does not utilize internal lubricants, but instead, relies upon soft metal lubricants plated upon the bearing sleeves and/or the bearing surfaces. These soft metal lubricants usually comprise lead, copper, silver, indium, tin and various combinations of these metals. Often these unsealed rolling cutter bits are utilized in blast hole drilling for mining operations, and in water well drilling. The non-sealed, non-lubricated bits of this nature generally are operated with pressurized air to remove the rock cuttings from the bore hole as the bit rotates and drills through the rock. The air flow through the bit performs several different functions, including the aforementioned removal of cuttings, plus a cooling function and as a barrier against the entrance of contaminants and cuttings into the bearing structure. The primary disadvantage of the unsealed friction bearing type bit is that the lubricant coated on the bearing surfaces eventually becomes inadequate to lubricate the bearings, and rapid bearing failure soon occurs.

In some embodiments of the soft metal lubricant bearing system, the lubricating metal is actually inlaid into the bearing surface on the journal, or may be inlaid into recesses in the cutter bearing surface. As a result of the inlay, the lubricant is not available to the bearing system unless a wearing away of the base steel in the bearing surfaces also occurs. As a result, increased tolerances between the bearing surfaces begin to appear, and eventually the bearing fails and the bit is lost.

The present invention overcomes the disadvantages of the soft metal lubricant bearing systems in the unsealed bits utilizing air pressure rather than drilling fluids. This is accomplished through the present invention by the provision of lubricant rods, or sticks, formed in a solid or semi-solid state and located in channels in either the bearing journal, or the cutter, or both; with a biasing means behind the rods to continuously bias the rods against the bearing surfaces and thereupon provide a continuing supply of lubricant material to the bearing surfaces.

BRIEF DESCRIPTION OF THE DRAWINGS

FIG. 2 is a broken-out, enlarged, cross-sectional area of the lug and cutter in a rolling cutter bit.

FIG. 3 is a broken-out, partial, cross-sectional view of a lug and cutter in an air bit.

FIGS. 4 and 5 are axial end views of lubricant sticks located in channels in the bit of FIG. 3.

DESCRIPTION OF THE PREFERRED EMBODIMENTS

Figure 1:
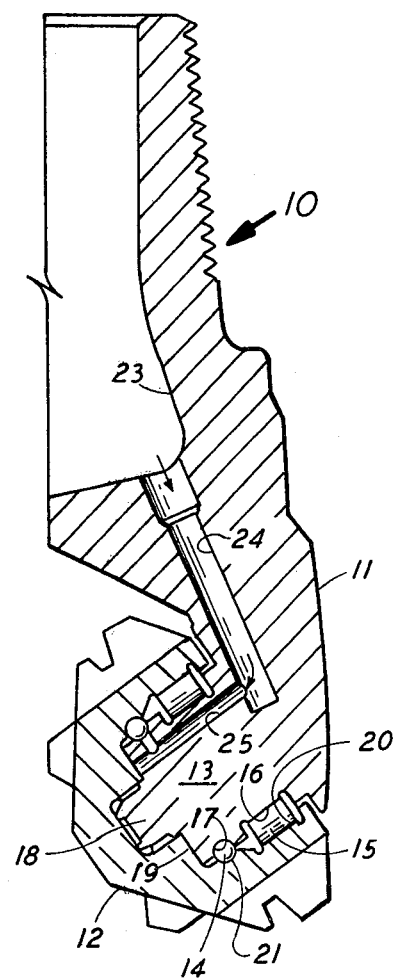
FIG. 1 is a cross-sectional view of the typical lug assembly of an air bit.

Referring to FIG. 1 in which a partial cross-sectional view of a rolling cutter drill bit is disclosed, the drill bit 10 consists of a downwardly extending lug member 11 upon which is rotatably mounted a cutter 12. Cutter 12 rotates on a bearing journal 13 by means of ball bearings 14 and roller bearings 15. Bearing journal 13 has a roller bearing groove 16 and a ball bearing race 17 formed in the outer surface thereof. At the downward end of bearing journal 13 is a smaller diameter shaft 18 called a pilot pin, or friction pin. An annular thrust face 19 is formed around friction pin 18 at the lower end of journal 13. Cutter 12 has a roller race 20 and a ball race 21 formed in the interior cavity thereof and arranged to align with races 16 and 17 in journal 13.

An inner cavity 23 is formed inside of bit 10 to communicate with the central bore passage of the drill string (not shown). A main air passage 24 extends downward from chamber 23 into the journal area of lug 11 whereupon it intersects with the plurality of journal air passages 25, which extend axially through the journal 13 and each of the other corresponding journals in the bit. Passage 25 extends from main air channel 24 to thrust face 19 to provide cooling fluid flow which communicates through the drill pipe into chamber 23 down channel 24 and into passage 25. In the present embodiment of the rolling cutter drill bit, the cooling fluid for which the bit is designed is pressurized air. A source of compressed air is attached to the drill string at the surface and is communicated through the drill string into chamber 23 through passage 24 and channel 25 to flush any possible contaminants out of the bearing system and also to provide a cooling fluid flow past the bearings 14 and 15 to extend bearing life.

Referring now to FIG. 2, a partial cross-sectional view of the cutter 12 and the bearing journal 13 is disclosed embodying several different embodiments of the present invention. In the first embodiment, a bore passage 26 is bored into the thrust face 19 of journal 13 a substantial distance. A stick or rod of bearing material 27 is slidably located in bore 26 and arranged to extend outward into contact with the thrust face 28 of cutter 12. A biasing source 29 is located between the end of bore passage 26 and the end of lubricant rod 27. In this embodiment, biasing means 29 is disclosed as a helical spring. A second lubricating rod 30 is disclosed in a second bore passage 31 located axially through friction pin 18 and biased outwardly therefrom by a coil spring 32 to rub against pin friction surface 33 in cutter 12.

A third location for a lubricating rod is illustrated in FIG. 2 comprising bore passage 34, lubricating rod 35 and biasing means such as a spring 36. In this instance, the bore passage 34 is formed in the cutter thrust face 28 such that lubrication rod 35 extends outward into abutment with thrust face 19 on journal 13. It should be noted that although all three locations of the lubricating rod are indicated in FIG. 2, any one or a combination of these locations could be utilized in a drilling bit. Likewise, the lubrication rod could be located at various angles and differing locations throughout the cutter-journal region. In the particular embodiments illustrated in FIG. 2, the type of rolling cutter drill bit illustrated is of the non-sealed bearing type with internal lubrication provided.

FIG. 3 illustrates a rolling cutter drill bit of the air cooled type having air passage means provided within the internal structure of the bit as depicted in FIG. 1. In FIG. 3, the air passage 25 extends through journal 13 and exits in thrust face 19. In one embodiment, as illustrated, a lubricating stick 37 is slidably located in passage 25 and extends outwardly to engage cutter thrust face 28. As shown in FIG. 4 and FIG. 5, the cross-sectional configuration of the lubricating rod 37 is preferably a polygonal shape in order to allow air flow to pass around the lubricating rod through air flow channels 38.

The secondary air flow channel 39 is formed in journal 13 communicating between air passage 25 and ball bearings 14. This provides a direct cooling air flow on the roller bearings. The location of lubricating rod 37 in passage 25 subjects rod 37 to a continuously biasing force provided by the air pressure in passage 25. This biasing force maintains rod 37 pressed outward against a cutter thrust face 28 and provides a continuous lubricating effect. In the illustrated embodiment, rod 37 extends backwardly past secondary channel 39 to prevent an unusually high pressure drop therethrough. Although this is desirable in the present instance, it is not critical and can be designed either way.

In the lower portion of FIG. 3, an alternate air passage system is shown having a bore passage 125 in which is located slidably a lubricating stick or rod 40. Just as was rod 37 lubricating rod 40 also is designed to have a polygonal cross-sectional area such as indicated in FIGS. 4 and 5. This allows for air flow areas 41 around the lubricating stick to provide air flow into the thrust bearing areas 18 and 28. It should be noted that although rod 37 is disclosed having a square cross-sectional area, and rod 40 is disclosed having a triangular cross-sectional area, either rod could have either configuration. Also, other irregular configurations could be utilized in order to provide flow relief areas around the stick inside the passage in which it is slidably located.

In typical operation, the present invention provides a continuously biased lubricating source in continuous contact with the various bearing load areas within the rolling cutter drill bit. The spring biasing means and the air pressure biasing means both serve to keep the lubricating rod pressed against the rotating surfaces within the bit. This continuous biasing provides a steady film of lubricant against the friction bearing areas, which continually migrates outward from the thrust areas 18 and 28 through ball bearing areas 14 and roller bearings 15. The continuous outward migration of lubricant is not only beneficial to the thrust face areas, but also provides a much-needed lubricant source to the various ball bearing and roller bearing areas.

Although the present invention discloses a roller bering type drill bit, it is just as desirable in the friction sleeve type drill bit in which the roller bearings 15 are replaced with a cylindrical sleeve bearing insert, such as is commonly used in rolling cutter drill bits, and is normally called a journal bearing sleeve. The continual flow of lubricant from the thrust face area past the journal bearing is highly desirable in the friction sleeve or journal sleeve type of bearing configuration.

The present invention, when utilized in the air-cooled bit, such as that disclosed in FIG. 3, results in the air flow carrying the lubricant material which has been worn from lubricant sticks 37 or 40, outward from the thrust bearing areas into the ball bearing systems 14 and the journal bearing or roller bearings 15. Since the air-cooled bit normally has no self-contained lubricant system other than just the soft metal lubricant originally plated on the thrust bearing areas and on the journal sleeve, the provision of the lubricant sticks, as disclosed in this invention, is particularly advantageous in this type of drilling bit. Thus, when a conventional soft metal lubricated bearing assembly begins to use up the soft metal on the bearing surfaces, larger clearances will occur between the rotating parts until they exceed the operating tolerance of the bit, and rapid failure occurs soon thereafter. With the present invention, the continuously migrating lubricant film provided by the lubricant rods forestalls the loss of the soft metal lubricants on the plated surfaces and greatly extends the life of the rolling cutter drill bit.

Lubricants which have been found to be particularly useful and advantageous in the present invention comprise the carbon-type lubricants, such as graphite, and the metallic lubricants, such as lead, tin, copper, silver, indium and combinations of these metals. Furthermore, hard solid greases and/or mixtures of hard solid greases with graphite and soft metals could be utilized in rod form. Other more exotic lubricants, such as molybdenum disulfide, could also be utilized.

Although certain preferred embodiments of the present invention have been herein described in order to provide an understanding of the general principles of the invention, it will be appreciated that various changes and innovations can be effected in the described rolling cutter drill bit without departure from these principles. For example, whereas all of the lubricating rods are illustrated in an axial or generally axial configuration, it is clear that these rods could also be located in a radial configuration to abut the radial thrust bearing faces of the cutter and/or the bearing journal. The cross-sectional configurations of the lubricating rods can be polygonal shapes other than rectangular and triangular, or can be any shape. Thus all modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows:

1. In a non-sealed rolling cutter drill bit having at least one bearing journal shaft and a rolling cutter rotatably mounted on the shaft and having at least one flat interior end face in rotary bearing contact with the end of said bearing journal shaft to support end thrust loads, the improvement comprising:

at least one lubricant rod slidably mounted in said shaft for longitudinal movement therein and arranged to contact said flat interior end face of said rolling cutter; and, biasing means associated with said lubricating rod and arranged to urge said rod against said flat interior end face during rotation of said rolling cutter to lubricate the end thrust bearing surfaces thereof.

2. The drill bit of claim 1 wherein
said lubricating rod is slidably located in a bore passage in said journal shaft.

3. The drill bit of claim 1 or 2 wherein
said rod comprises a generally solid lubricant selected from the group of graphite, molybdenum disulfide, and soft metal.

4. The drill bit of claims 1 or 2 wherein
said biasing means comprises a resilient biasing member.

5. The drill bit of claims 1 or 2 wherein
said biasing means comprises a pressurized fluid biasing system.

6. A rolling cutter drill bit having a plurality of downwardly extending lugs, each having a cantilevered bearing journal extending downwardly therefrom, and a rolling cutter rotatably mounted on each said bearing journal by bearing means and having at least one flat interior end face in rotary bearing contact with the end of said bearing journal to provide an end bearing for supporting end thrust loads, the improvement comprising at least one bore passage formed in said bearing journal and communicating with the end thereof;

a lubrication stick slidably located in said bore passage and arranged to contact said flat interior end face of said rolling cutter, and, biasing means arranged to bias said lubrication stick out of said passage against said flat interior end face during rotation of said rolling cutter to lubricate the end thrust bearing surfaces thereof.

7. The drill bit of claim 6 wherein said biasing means comprises a spring and said lubrication stick comprises a generally solid lubricant selected from the group of graphite, molybdenum disulfide and a soft metal.

8. The drill bit of claim 6 wherein said biasing means comprises a pressurized fluid biasing system and said lubrication stick comprises a generally solid lubricant selected from the group of graphite, molybdenum disulfide and a soft metal.

* * * * *